(12) United States Patent
Langley et al.

(10) Patent No.: US 8,931,142 B2
(45) Date of Patent: Jan. 13, 2015

(54) STATIC DISSIPATIVE CABLE TIES, SUCH AS FOR RADIATION BELT STORM PROBES

(71) Applicant: Johns Hopkins University, Baltimore, MD (US)

(72) Inventors: Patrick T. Langley, Laurel, MD (US); Fazle E. Siddique, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 13/932,201

(22) Filed: Jul. 1, 2013

(65) Prior Publication Data

US 2013/0283573 A1    Oct. 31, 2013

Related U.S. Application Data

(62) Division of application No. 12/777,312, filed on May 11, 2010, now Pat. No. 8,496,864.

(60) Provisional application No. 61/314,424, filed on Mar. 16, 2010.

(51) Int. Cl.
  *A45F 5/10* (2006.01)
  *B65D 63/10* (2006.01)
  *B29C 71/02* (2006.01)
  *B29C 71/04* (2006.01)

(52) U.S. Cl.
  CPC ............ *B65D 63/1027* (2013.01); *B29C 71/02* (2013.01); *B29C 71/04* (2013.01); *B65D 63/1063* (2013.01)
  USPC ......................................... 24/16 PB; 264/345

(58) Field of Classification Search
  CPC .................................. H01B 3/445; H01B 3/00
  USPC ......................................... 264/345; 24/16 PB
  See application file for complete search history.

(56) References Cited

U.S. PATENT DOCUMENTS

| | | |
|---|---|---|
| 4,237,441 A | 12/1980 | Van Konynenburg et al. |
| 4,677,521 A | 6/1987 | Frazier |
| 4,698,724 A | 10/1987 | Burvee |
| 4,782,425 A | 11/1988 | Breidegam |
| 4,902,444 A | 2/1990 | Kolouch |
| 5,000,875 A | 3/1991 | Kolouch |
| 5,083,367 A | 1/1992 | Klepel |
| 5,216,204 A | 6/1993 | Dudek et al. |
| 5,744,573 A | 4/1998 | Brubaker |
| 6,049,949 A | 4/2000 | Guthke |
| 6,533,955 B1 | 3/2003 | Molnar et al. |

(Continued)

OTHER PUBLICATIONS

Liu et al., "Conductive behavior of composites composed of carbon black-filled ethylene-tetrafluoroethylene copolymer", J Material Sci (Mar. 2007) 42:2903-2906.*

(Continued)

*Primary Examiner* — Galen Hauth
(74) *Attorney, Agent, or Firm* — Noah J. Hayward

(57) ABSTRACT

An article, such as, but not limited to, a cable strap to wrap, support, or secure one or more wires or cables, is formed by cyclically heating and cooling and/or irradiating an article formed of a static dissipative ethylene tetrafluoroethylen (ETFE) resin, to reduce an electrical resistivity and/or to increase a tensile strength of the article.

7 Claims, 5 Drawing Sheets

(56) References Cited

U.S. PATENT DOCUMENTS

| | | |
|---|---|---|
| 6,698,069 B2 | 3/2004 | Caveney et al. |
| 6,745,439 B2 | 6/2004 | Brownlee et al. |
| 6,928,701 B2 | 8/2005 | Hutter, III |
| 7,350,826 B2 | 4/2008 | Cantrell et al. |
| 2006/0012199 A1 | 1/2006 | Slank |
| 2011/0225776 A1 | 9/2011 | Langley et al. |

OTHER PUBLICATIONS

Wikipedia (author unknown), "Cable Tie," retrieved via the Internet at http://en.wikipedia.org/wiki/Cable_tie, 2 pages, last accessed Jul. 15, 2009.

Global Sources (author unknown), "Ningbo Hentek Dragon Electronics Co. Ltd—Cable Ties," retrieved via the Internet at http://hentek.manufacturer.globalsources.com/si/6008825742524/pdtl/Cable-tie/10146248, 3 pages, last accessed Jul. 15, 2009.

* cited by examiner

STATIC DISSIPATIVE CABLE TIES, SUCH AS FOR RADIATION BELT STORM PROBES

CROSS-REFERENCE TO RELATED APPLICATIONS

This application is a divisional of co-pending U.S. Provisional application Ser. No. 12/777,312, filed May 11, 2010, which claims priority to and the benefit of prior-filed U.S. Provisional Application No. 61/314,424, filed Mar. 16, 2010, now expired, the contents of which are herein incorporated by reference in their entireties.

STATEMENT OF GOVERNMENTAL INTEREST

This invention was made with government support under contract number NAS5-01072 awarded by the National Aeronautics and Space Administration (NASA). The government has certain rights in the invention.

BACKGROUND

1. Technical Field

Methods of processing an article formed of a static dissipative ethylene tetrafluoroethylene (ETFE) resin, such an such as to reduce an electrical resistivity and/or to increase a tensile strength of the article, and ETFE-based articles produced in accordance with methods disclosed herein.

2. Related Art

Poly(ethylene-co-tetrafluoroethylene), commonly referred to as ethylene tetrafluoroethylene, or ETFE, is a polymer having a relatively high melting temperature, relatively high corrosion resistance and strength over a relatively wide temperature range, and relatively high electrical and high-energy radiation resistance properties. ETFE also tends to have better mechanical toughness and chemical resistance compared to polytetrafluoroethylene (PTFE), a synthetic fluoropolymer of tetrafluoroethylene, such as DuPont Teflon®.

ETFE is used in space, nuclear, and aviation industries for cable ties and wire coatings. ETFE based cable ties tend to have a relatively high strength to weight ratio and relatively low outgassing characteristics.

ETFE also tends to have relatively high volumetric and surface electrical resistivity, which may lead to electrical charging or static build-up. For example, in an extraterrestrial environment, elements of a spacecraft or satellite may become electrically charged due to photoelectric effects (sunlight) and/or electron flux. Satellites in geosynchronous orbits are particularly susceptible to electron flux found in outer regions of the outer radiation belt.

Another concern is deep dielectric discharge (DDD). In a flux of relatively high-energy electrons, electrons may penetrate an outer surface of a spacecraft and enter dielectric materials such as circuit boards and coaxial cable insulation. When the charge build-up exceeds a threshold, such as a dielectric strength of a material, the charge may suddenly discharge to and/or through other elements, such as electrical circuits and/or sensors. This may cause severe and potentially catastrophic damage.

An ETFE resin may include carbon black or other additive to provide a measure of static dissipation. For example, a Tefzel® HT-2170 fluoropolymer is marketed by E.I. du Pont de Nemours and Company of Wilmington, Del., U.S.A., as a static-dissipating semi-conductive resin. According to marketing materials, DuPont™ Tefzel® fluoropolymers are melt-processible thermoplastics, and are part of a family of fluorine-based products that include Teflon® PTFE, Teflon® FEP, and Teflon® PFA fluoropolymers resins.

It has been observed that, while a sheet formed of such a static dissipative resin may have an electrical resistivity as low as 1.4 Mega Ohms as measured between points located over approximately 4 inches apart, cable ties formed from the resin have been observed to have an electrical resistivity several orders of magnitude greater.

SUMMARY

Disclosed herein are methods of processing an article formed of a static dissipative ethylene tetrafluoroethylene (ETFE) resin, such an such as to reduce an electrical resistivity and/or to increase a tensile strength of the article, and ETFE-based articles produced in accordance with methods disclosed herein.

An article formed of a static dissipative ETFE resin may include, for example and without limitation, a cable strap to wrap, support, and/or secure one or more wires or cables, such as a cable tie.

An article formed of a static dissipative ETFE resin may be processed with repeated heating and cooling cycles, such as to reduce an electrical resistivity and/or to increase a tensile strength of the article.

An upper temperature of a heating and cooling cycle may be within a range of approximately 150° C. and a melting point of the article. The melting point of the article may be in a range of, for example, approximately 220° C. to 250° C. The upper temperature may be within a range of approximately 180° C. and 200°, inclusively.

A lower temperature of a heating and cooling cycle may correspond to an ambient or room temperature, which may be approximately 25° C.

An article formed of a static dissipative ETFE resin may be irradiated, such as to increase a tensile strength of the article. An ETFE-based article may be irradiated to within a range of approximately 5 mega rads (Mrads) to 10 Mrads, inclusively, wherein a rad is a measurement of radiation equal to 10 milligrays of radiation.

An ETFE-based article may be heat-treated and irradiated.

BRIEF DESCRIPTION OF THE DRAWINGS/FIGURES

Figure 1:
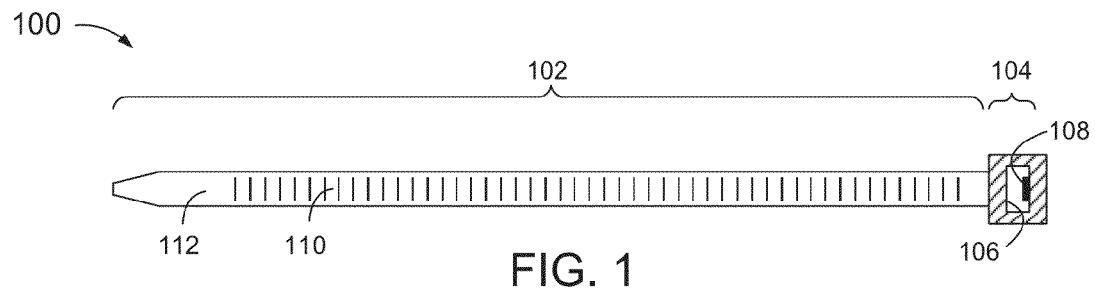
FIG. 1 is an elevated view of an example flexible cable tie, which may be formed from a static dissipative ETFE resin.

In the drawings, the leftmost digit(s) of a reference number identifies the drawing in which the reference number first appears.

DETAILED DESCRIPTION

Disclosed herein are methods of processing articles formed from static dissipative ethylene tetrafluoroethylene (ETFE) resin, such as to improve one or more of electrical conductivity and tensile strength. Such an article may include, for example and without limitation, a cable strap to wrap, support, and/or secure one or more wires or cables, such as a cable tie.

FIG. 1 is an elevated view of an example flexible cable tie 100, including a strap portion 102 and a lock portion 104, which may be formed from a static dissipative ETFE resin such as, for example and without limitation, DuPont Tefzel® HT-2170 resin.

Figure 2:
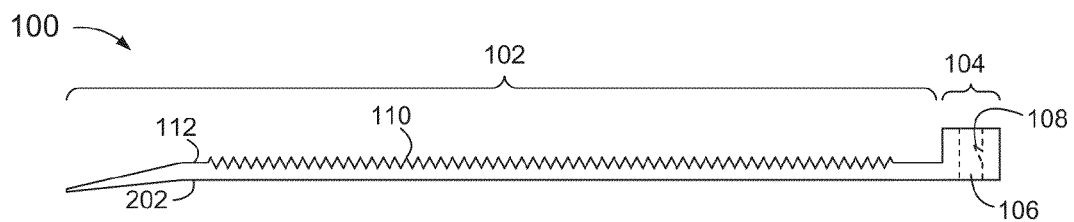
FIG. 2 is a side view of the cable tie of FIG. 100.

FIG. 2 is a side view of cable tie 100.

Figure 3:
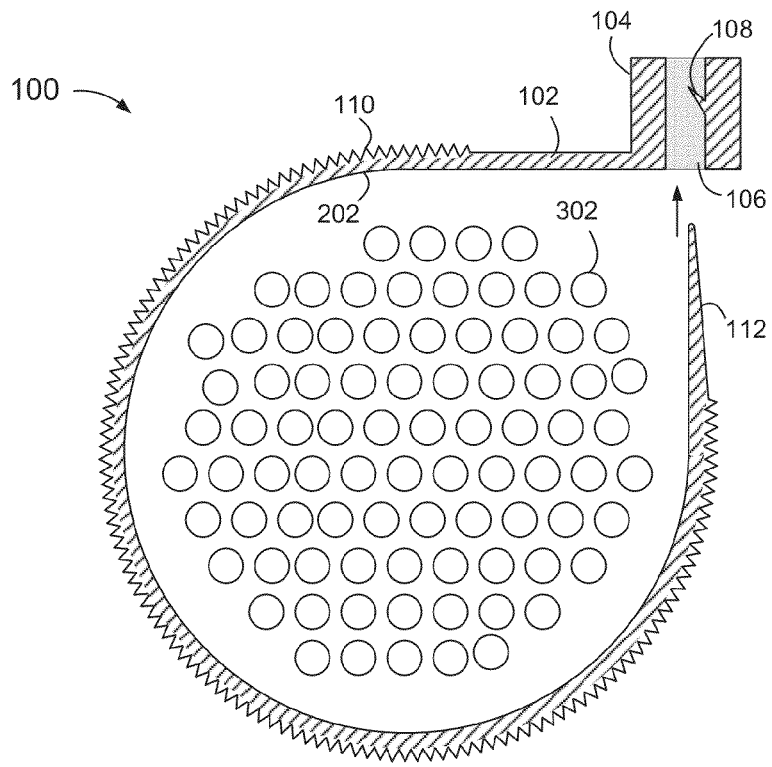
FIG. 3 is a side view of the cable tie of FIG. 100, in wrapped position to secure wires or cables.

FIG. 3 is a side view of cable tie 100, in wrapped position to secure wires or cables 302.

Lock portion 104 includes a channel 106 therethrough to receive strap portion 102, such as illustrated in FIG. 3.

Lock portion 104 further includes a lock mechanism 108, which may include a frangible tab, such as illustrated in FIGS. 2 and 3, to lockingly engage features 110 of a first surface 112 of strap portion 102, as strap portion 102 is inserted through lock portion 104.

Lock portion 104, or portions thereof, such as lock mechanism 108, may include and/or may be implemented with metal.

In FIGS. 2 and 3, features 110 are illustrated as alternating ridges and depressions of first surface 112.

In FIG. 2, a second surface 202 of strap portion 202 may be relatively smooth.

Cable tie 100 is an example article having a strap portion to wrap, support, and/or secure one or more wires or cables.

A plurality of cable straps, such as cable ties 100, may be used to bundle wires or cables of wires in an electrical assembly or system, such as to reduce or eliminate movement of the wires relative to one another and/or to guide the wires in accordance with a wire routing plan.

Where the electrical resistivity of a cable strap is relatively significant, electrical charge may accumulate on the cable strap until a critical charge level is reached, at which point a sudden discharge may occur.

For some environments, such as extraterrestrial environments, wires or cables may be wrapped with a static dissipative covering, such as electrically conductive metal foil and/or other electrically conductive material. This may help to reduce or prevent charge buildup on wire insulation and/or other dielectric materials. Additionally, cable straps formed from a static dissipative resin, such as, for example and without limitation, DuPont Tefzel® HT-2170 resin, may be utilized.

A cable strap formed of static dissipative EFTE resin may be evaluated with respect to one or more properties, including, without limitation, resistivity, tensile strength, and outgassing characteristics. One or more such properties may be of relatively critical importance to an application. For example, specifications for an extraterrestrial application may include a relatively low resistivity and a relatively high tensile strength. With respect to outgassing, an extraterrestrial application may call for a relatively low total mass loss (TML), and relatively low collected volatile condensable materials (CVCM).

As disclosed herein, an article formed of a static dissipative ETFE resin may be heat-treated, such as to reduce an electrical resistivity and/or to increase a tensile strength.

As further disclosed herein, an article formed of a static dissipative ETFE resin may be irradiated, such as to increase tensile strength.

Heat Treatment

Figure 4:
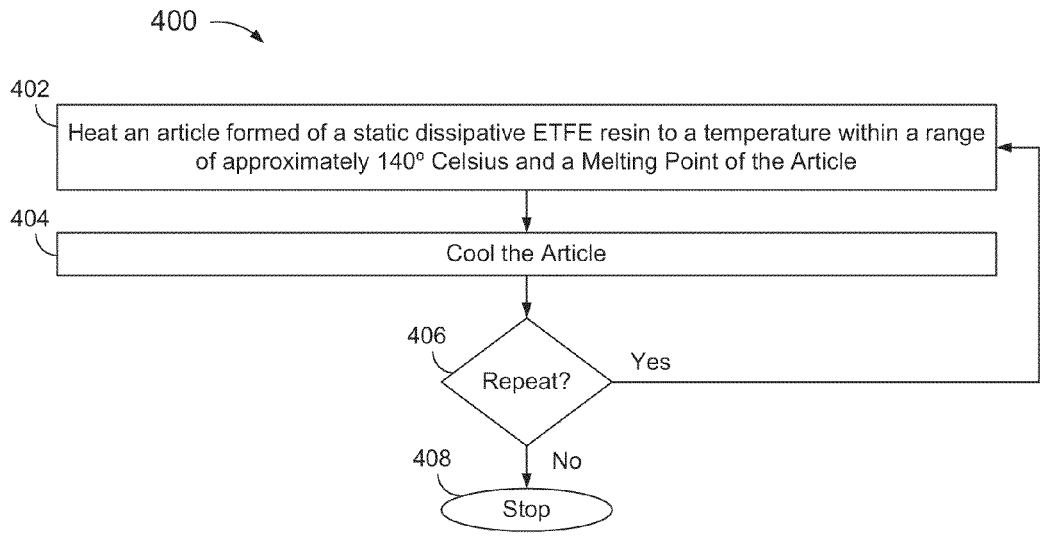
FIG. 4 is a flowchart of a method of cyclically heating and cooling an article formed of a static dissipative ETFE resin, such as to reduce an electrical resistivity and/or to increase a tensile strength of the article.

FIG. 4 is a flowchart of a method 400 of cyclically heating and cooling an article formed of a static dissipative ETFE resin, such as to reduce an electrical resistivity and/or to increase a tensile strength of the article. Method 400 may be implemented with respect to a cable strap, such as cable tie 100.

At 402, an article formed of a static dissipative ETFE resin is heated to a temperature within a range of approximately 150° C. and a melting point of the article. The melting point of the article may be in a range of, for example, approximately 220° C. to 250° C.

At 402, the article is cooled. The article may be cooled to a temperate within a range. The range may include, for example, an ambient temperature, such as a room temperature.

At 406, the heating at 402 and the cooling at 404 may be repeated in a cyclical fashion. Subsequent iterations of the heating at 402 and/or the cooling at 404 may be performed with respect to one or more other temperatures within the corresponding ranges.

Thermal cycling in accordance with method 400 may reduce electrical resistivity of an article by reducing residual stress in the ETFE polymer of the article. As the polymer chains move or adjust to relieve stress, static dissipative and/or electrically conductive elements of the ETFE resin, which may include carbon black particles, may be segregated away from the polymer. This may lead to longer chains of static dissipative or conductive particles, and may improve the strength of the polymer. A lower bulk resistivity of the article is measurable. Measured resistivity values of a control group of cable straps and groups of heat-treated cable straps are disclosed below with respect to Tables 1, 3, 4, 5, and FIG. 8.

Thermal cycling in accordance with method 400 may increase tensile strength of an article. Measured tensile strengths of control groups of cable straps and groups of heat-treated cable straps are disclosed below with respect to Tables 6 and 7.

In FIG. 4, heating at 402 and cooling at 404 may end at 408 when an electrical resistivity of the article is lower than an initial electrical resistivity of the article.

Method 400, or portions thereof, may be performed in accordance with a thermal cycling profile, which may be implemented under control of a computer system. For example, and without limitation, heating at 402 may include maintaining the article at the heated temperature for a pre-determined period of time. Similarly, cooling at 404 may include maintaining the article at the cooled temperature for a pre-determined period of time.

Heating at 402 may include controlling a heating rate of the article, such as by increasing the temperature gradually over a predetermined period of time. Similarly, cooling at 404 may include controlling a cooling rate of the article. Controlling of a heating and/or cooling rate may include holding the article at one or more intermediate temperatures for a per-determined period of time.

Heating at 402 and cooling at 404 may be repeated a pre-determined number of times, such as described below with respect to FIG. 5.

Figure 5:
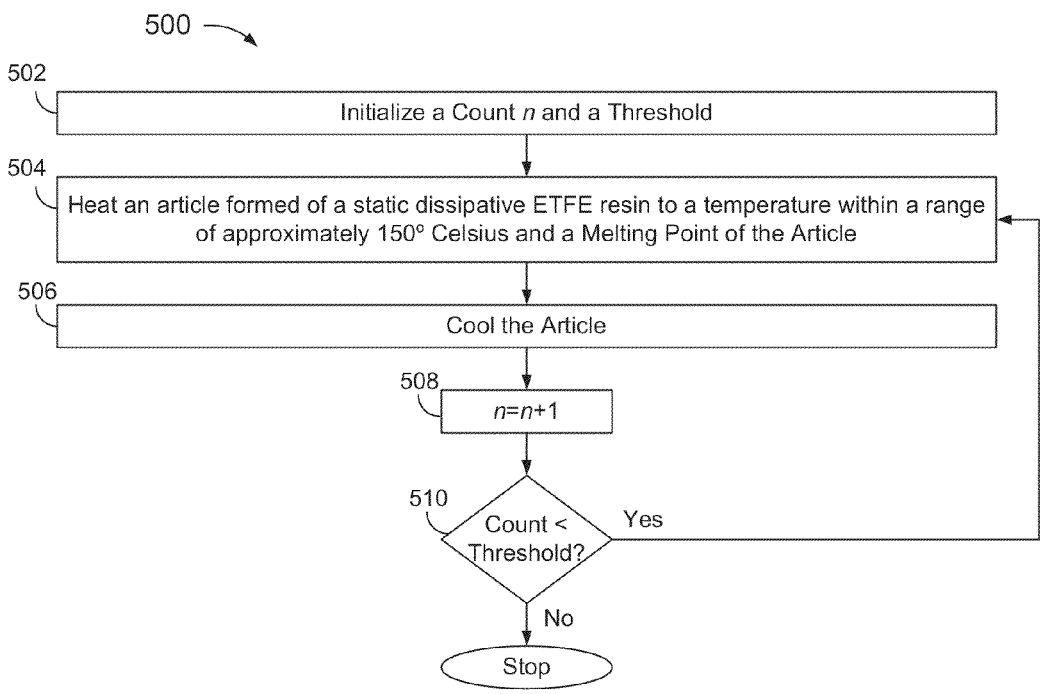
FIG. 5 is a flowchart of another method of cyclically heating and cooling an article formed of a static dissipative ETFE resin.

FIG. 5 is a flowchart of a method 500 of cyclically heating and cooling an article formed of a static dissipative ETFE resin, such as to reduce an electrical resistivity of the article and/or to increase a tensile strength of the article. Method 500 may be implemented with respect to a cable tie, such as cable tie 100.

At 502, a count n and a threshold are initialized. The threshold may be initialized to, for example, ten (10).

At 504, an article formed of a static dissipative ETFE resin is heated to a temperature within a range of approximately 150° C. and a melting point of the article, such as described above with respect to 402 in FIG. 4.

At 506, the article is cooled, such as described above with respect to 404 in FIG. 4.

At 508, count n is incremented.

At 510, count n is compared to the threshold. Where count n does not meet or exceed the threshold, processing returns to 504 to perform another cycle of heating at 504 and cooling at 506.

Heat Treatment Experimental Results: Resistivity

Table 1 lists electrical resistivity measurements of a control group of cable ties, referred to herein as Group A, and formed from DuPont Tefzel® HT-2170 static dissipative resin. The resistivity measurements are provided in mega Ohms or MΩ, with respect to first, second, and third resistivity measurements, described below with respect to FIGS. 6 and 7.

Figure 6:
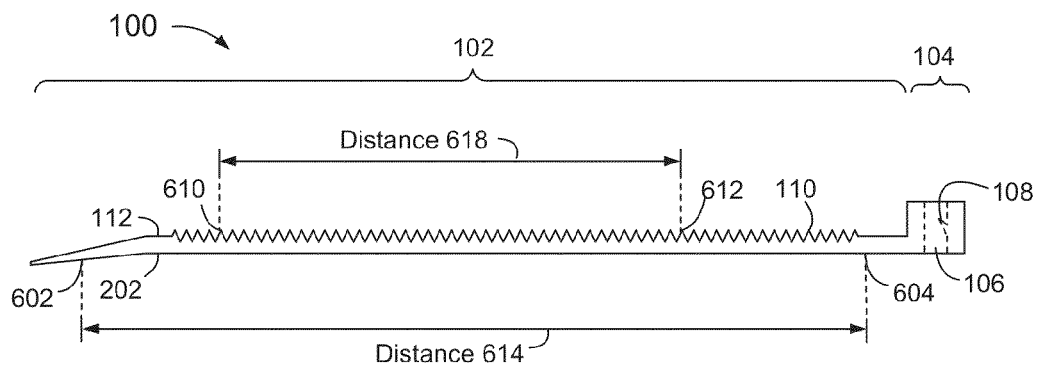
FIG. 6 is another side view of the cable tie of FIG. 1, including example measurement points at which to measure electrical resistivity.

FIG. 6 is another side view of cable tie 100, including resistivity measurement points 602, 604, 610 and 612.

Figure 7:
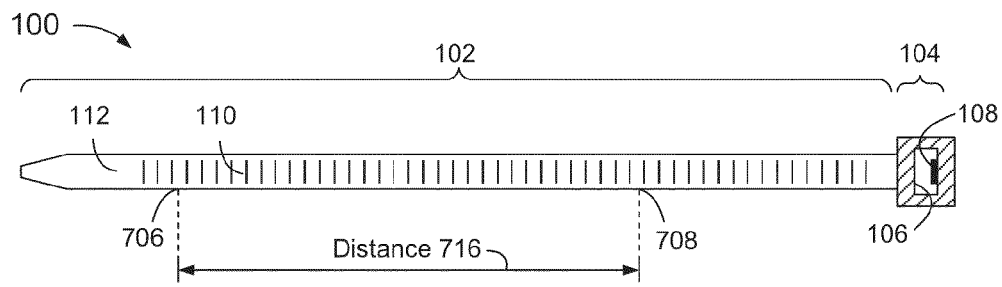
FIG. 7 is another elevated view of the cable tie of FIG. 1, including additional example resistivity measurement points.

FIG. 7 is another elevated view of cable tie 100, including additional resistivity measurement points 706 and 708.

A first resistivity measurement corresponds to points 602 and 604 in FIG. 6, which may be separated by a distance of approximately 5½ to 6½ inches. A second resistivity measurement corresponds to points 706 and 708 in FIG. 7, which may be separated by a distance 716 of approximately 3 to 4 inches. A third resistivity measurement corresponds to points 610 and 612 in FIG. 6, which may be separated by a distance 618 of approximately 3 to 4 inches.

TABLE 1

Electrical Resistivity Measurements of Control Group A

| ID | First Measurement (MΩ) | Second Measurement (MΩ) | Third Measurement (MΩ) |
| --- | --- | --- | --- |
| A1 | 120 | 650 | 950 |
| A2 | 530 | 2,200 | 1,600 |
| A3 | 30 | 30,000 | 5,000 |
| A4 | 550 | 4,500 | 1,700 |
| A5 | 120 | 4,000 | 4,000 |
| A6 | 150 | 900 | 600 |
| A7 | 74 | 2,300 | 1,600 |
| A8 | 170 | 1,100 | 500 |
| A9 | 40 | 3,100 | 500 |
| A10 | 25 | ∞ | 2,600 |
| Average | 181 | 5,417 | 1,905 |
| Standard Deviation | 196 | 9,316 | 1,536 |

As illustrated in Table 1, average resistivity measurements of cable ties A1 through A10, for the first, second and third measurements, is 181 MΩ, 5,417 MΩ, and 1,905 MΩ, respectively, with corresponding standard deviations of 196, 9,316, and 1,536.

A group of ten (10) cable ties, identified herein as Group B cable ties, B1 through B10, were cyclically heat-treated in accordance with a first profile.

Another group of ten (10) cable ties, identified herein as Group C cable ties, C1 through C10, were cyclically heat-treated in accordance with a second profile.

Table 2 lists parameters of the first and second profiles.

TABLE 2

Heating/Cooling Profiles

| Profile | Number of Cycles (n) | Lower Temperature | Upper Temperature | Hold Time |
| --- | --- | --- | --- | --- |
| First | 10 | 25° C. | 180° C. | 1 Hour |
| Second | 10 | 25° C. | 200° C. | 1 Hour |

Table 3 provides resistivity measurements of Group B cable ties subsequent to processing in accordance with the first profile.

Table 4 provides resistivity measurements of Group C cable ties subsequent to processing in accordance with the second profile.

TABLE 3

10 Cycles, 25° C./180° C., 1 Hour Hold Time

| ID | First Measurement (MΩ) | Second Measurement (MΩ) | Third Measurement (MΩ) |
| --- | --- | --- | --- |
| B1 | 20 | 140 | 200 |
| B2 | 12 | 19 | 65 |
| B3 | 18 | 160 | 100 |
| B4 | 70 | 240 | 600 |
| B5 | 11 | 50 | 40 |
| B6 | 12 | 35 | 38 |
| B7 | 8 | 28 | 31 |
| B8 | 30 | 140 | 68 |
| B9 | 18 | 270 | 540 |
| B10 | 6 | 105 | 14 |
| Average | 21 | 119 | 169.6 |
| Standard Deviation | 19 | 88 | 218 |

TABLE 4

10 Cycles, 25° C./200° C., 1 Hour Hold Time

| ID | First Measurement (MΩ) | Second Measurement (MΩ) | Third Measurement (MΩ) |
| --- | --- | --- | --- |
| C1 | 6 | 12 | 12 |
| C2 | 2.1 | 25 | 4.2 |
| C3 | 3.6 | 5 | 4.1 |
| C4 | 3 | 43 | 24 |
| C5 | 2.6 | 5.5 | 3.6 |
| C6 | 17 | 80 | 120 |
| C7 | 7.4 | 12.3 | 26 |
| C8 | 8.5 | 60 | 100 |
| C9 | 4.7 | 13 | 10.2 |
| C10 | 3.7 | 10.3 | 9.1 |
| Average | 6 | 27 | 31.32 |
| Standard Deviation | 4 | 26 | 42 |

As illustrated in Table 3, an average resistivity of Group B cable ties for the first, second and third measurements, is 21 MΩ, 119 MΩ, and 169.65 MΩ, respectively, with corresponding standard deviations of 19, 88, and 218.

As illustrated in Table 4, an average resistivity of Group C cable ties for the first, second and third measurements, is 6

MΩ, 27 MΩ, and 31.32 MΩ, respectively, with corresponding standard deviations of 4, 26, and 42.

Table 5 provides comparisons of the average resistivity measurements of Tables 3 and 4 relative to Table 1.

TABLE 5

Average Resistivity Decreases Relative to Control Group A

| Comparison | Heat Temperature | First Measurement (MΩ) | Second Measurement (MΩ) | Third Measurement (MΩ) |
| --- | --- | --- | --- | --- |
| Group B | 180° C. | 88.4% | 97.8% | 91.1% |
| Group C | 200° C. | 96.7% | 99.5% | 98.4% |

In Table 5, with respect to Group B, it can be seen that ten heating and cooling cycles, between 25° C. and 180° C., with hold times of 1 hour at the upper and lower temperatures, reduced the average electrical resistivity of the first, second, and third measurements by 88.4%, 97.8%, and 91.1%, respectively.

With respect to Group C, it can be seen that ten heating and cooling cycles, between 25° C. and 200° C. with hold times of 1 hour at the upper and lower temperatures, reduced the average electrical resistivity of the first, second, and third measurements by 96.7%, 99.5%, and 98.4%, respectively.

Figure 8:
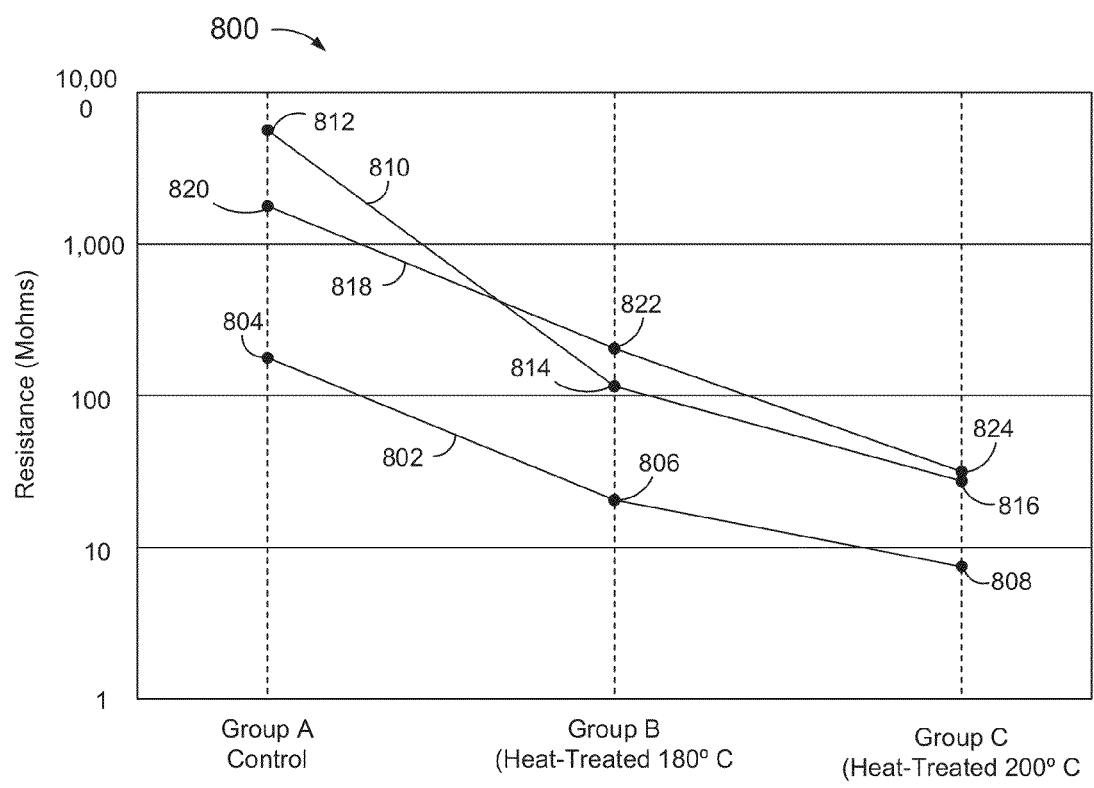
FIG. 8 is a graph of average electrical resistivity measurements of a control group of cable ties, and of groups of cable ties treated with cyclical heating and cooling processes.

FIG. 8 is a graph 800 of the average electrical resistivity measurements of Tables 1, 3, and 4.

Graph 800 includes a first line 802, corresponding to the first measurement described above. First line 802 includes:

a point 804 at approximately 181 MΩ corresponding to the average of the first measurements of Table 1;

a point 806 at approximately 21 MΩ corresponding to the average of the first measurements of Table 3; and a point 808 at approximately 6 MΩ corresponding to the average of the first measurements of Table 4.

Graph 800 includes a second line 810, corresponding to the second measurement described above. Second line 810 includes:

a point 812 at approximately 5,417 MΩ corresponding to the average of the second measurements of Table 1;

a point 814 at approximately 119 MΩ corresponding to the average of the second measurements of Table 3; and a point 816 at approximately 27 MΩ corresponding to the average of the second measurements of Table 4.

Graph 800 includes a third line 818, corresponding to the third measurement described above. Third line 818 includes:

a point 820 at approximately 1,905 MΩ corresponding to the average of the third measurements of Table 1;

a point 822 at approximately 196.6 MΩ corresponding to the average of the third measurements of Table 3; and a point 824 at approximately 31.32 MΩ corresponding to the average of the third measurements of Table 4.

Heat Treatment Experimental Results: Tensile Strength

Table 6 lists measured tensile strengths of five (5) control groups of cable ties, referred to herein as Group A' (cable ties A1-A7 of Group A), and Groups F, G, H, and I, all formed from DuPont Tefzel® HT-2170 static dissipative resin. Groups A, H, and I were manufactured from the same lot of resin. Groups A, H, and I were evaluated at different times and in different ways, such as described below.

TABLE 6

Control Group Tensile Strengths (lbs)

| ID | Minimum | Maximum | Average | Mean | Standard Deviation |
| --- | --- | --- | --- | --- | --- |
| Group A' (A1-A7) | — | — | — | 46.8 | 3.87 |
| Group F (Mfg. Tested, Type TYZ23M-SF) | 25.3 | 30.2 | 27.47 | — | — |
| Group G (Mfg. Tested, Type TYZ23M-SF) | 23.1 | 33.3 | 25.99 | — | — |
| Group H (Mfg. Tested, Type TYZ25M-SF) | 58 | 69.3 | 65.2 | — | — |
| Group I (Mfg. Tested, Type TYZ25M-SF) | 52.3 | 58.3 | 56.06 | — | — |

Tensile strengths of Groups A', G, and I, were measured at ambient, or room temperature. Tensile strengths of Groups F, and H were observed at an elevated temperature.

Group A cable ties were manufactured in accordance with a well known industry specification TYZ25M-SF, as 7" long cable ties, nominally rated for a tensile strength of 50 pounds.

Group F and G cable ties were manufactured in accordance with a well known industry specification TYZ23M-SF, which is well known in the art. Group H and I cable ties were manufactured in accordance with a TYZ25M-SF specification, which is well known in the art.

Tensile strengths of cable tie Groups F, G, H and I were manufacturer-measured in accordance with industry standards.

Tensile strengths of Group A cable ties were measured with a modified version of a specification SAE-AS-23190, promulgated by SAE International, of Warrendale, Pa., U.S.A., as published on Jun. 1, 2008. Under the modified version of the specification, a crosshead speed of one inch per minute was used with a 1.5" diameter mandrel. The cable ties were pulled to failure and the corresponding failure loads were recorded.

Figure 9:
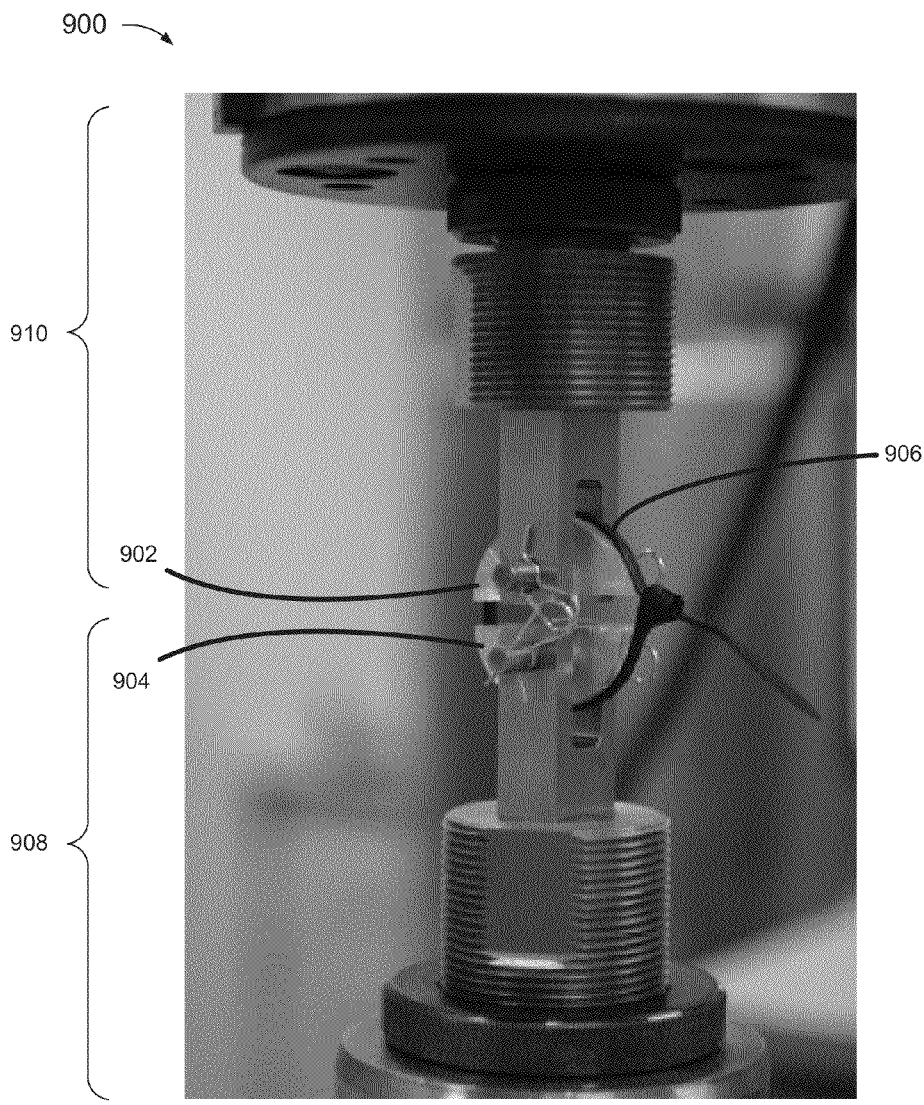
FIG. 9 is a picture of a portion of a tensile strength measurement device.

FIG. 9 is a picture of a portion of a tensile strength measurement device 900, including first and second semi-circular elements 902 and 904 to hold a cable tie 906 in a locked wrapped position. Device 900 further includes a based 908 coupled to second semi-circular element 904, and a tension element 910 coupled to second semi-circular element 902, to pull first semi-circular element 902 away from second semi-circular element 904 in response to a tensile force applied thereto. Device 900 further includes a measurement system to measure the tensile force at which cable tie 906 breaks.

Table 7 lists tensile strengths of two groups of heat-treated cable ties, Group B' and Group C', measured in accordance with the modified version of specification SAE-AS-23190. Group B' includes heat-treated cable ties B1-B7. Group C' includes heat-treated cable ties C1-C7.

Group B and C cable ties were also manufactured in accordance with the industry standard specification TYZ25M-SF, as 7" long cable ties, nominally rated for a tensile strength of 50 pounds.

Table 7 further lists tensile strength increases of Groups B' and C', relative to control Group A'.

TABLE 7

Measured Tensile Strengths (lbs) of Heat-Treated Cable Ties

| ID | Heat Treatment | Mean Tensile Strength | Standard Deviation | Percent Change Relative to Control Group A' |
|---|---|---|---|---|
| Group B' (B1-B7) | Profile 1 (10 cycles between 180° C. and 25° C., 1 hour holds) | 49.4 | 2.01 | +5.6% |
| Group C' (C1-C7) | Profile 2 (10 cycles between 200° C. and 25° C., 1 hour holds) | 50.8 | 1.53 | +8.5% |

As can be seen from Table 7, heat treatment in accordance with profile 1 increased tensile strength by 5.6%. Heat treatment in accordance with profile 2 increased tensile strength by 8.5%.

Irradiation

Figure 10:
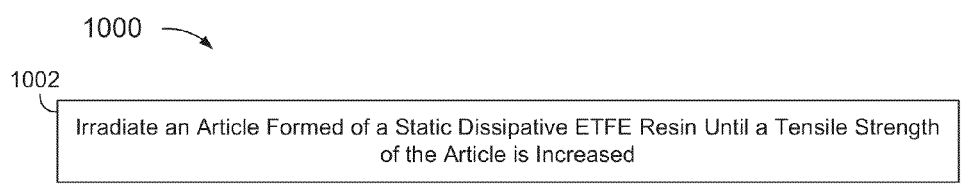
FIG. 10 is a flowchart of a method of irradiating an article formed of a static dissipative ETFE resin, such as to increase tensile strength of the article.

FIG. 10 is a flowchart of a method 1000 of irradiating an article formed of a static dissipative ETFE resin, such as to increase tensile strength of the article. Method 1000 may be implemented with respect to a cable strap, such as cable tie 100. Method 1000 may be implemented alone and/or in combination with one or more of methods 400 and 500, and/or combinations thereof.

At 1002, an article formed of a static dissipative EWE resin is irradiated until a tensile strength of the article is increased.

The article may be irradiated at a radiation rate, and for a time sufficient to irradiate the article with a selected or desired amount of radiation. The radiation rate may include, for example and without limitation, approximately 17 rads/second, wherein a rad is a measurement of radiation equal to 10 milligrays of radiation. The amount of radiation may be within a range of approximately 5 Mrads to 10 Mrads, inclusively.

Irradiation Treatment Experimental Results

As described above. Table 6 lists measured tensile strengths of five (5) control groups of cable ties.

Table 8 lists tensile strengths of two groups, D and E, of irradiated cable ties. Group D includes cable ties D1-D5. Group E includes cable ties E1-E10. Table 8 further lists corresponding tensile strength increases relative to control Group A'.

Cable tie Groups D and E were irradiated with a Cobalt-60 Gamma irradiator. The cable ties were placed in a nitrogen-purged sealed bag to minimize effects of oxygen during testing. The samples were irradiated at a rate of approximately 17.7 rad/sec, using two 3000 Curie Co-60 Gamma sources at a distance of approximately 200 mm. The gamma rays from Co-60 have an average energy of 1.25 MeV per photon.

Group D cable ties were irradiated to 5 Mrad.

Group E cable ties were irradiated to 10 Mrad, which may correspond to a maximum expected unshielded irradiation level of a radiation belt storm environment.

TABLE 8

Measured Tensile Strengths (lbs) Following Irradiation

| ID | Irradiation | Mean Tensile Strength (lbs) | Standard Deviation (lbs) | Percent Change Relative to Control Group A' |
|---|---|---|---|---|
| Group D | 5 Mrad | 50.0 | 1.46 | +6.8% |
| Group E | 10 Mrad | 49.8 | 3.03 | +6.4% |

As can be seen from Table 8, irradiation to 5 Mrads increased mean tensile strengths by 6.8%. Irradiation to 10 Mrads increased mean tensile strength by 6.4%.

Outgassing

A sample of a static dissipative resin, of the type that was used to manufacture the cable ties of Groups A through I, was evaluated with respect to thermal vacuum outgassing behavior. The thermal vacuum outgassing was determined in accordance with a ASTM E595 standard, titled, "Standard Test Method for Total Mass Loss and Collected Volatile Condensable Materials from Outgassing in a Vacuum Environment," promulgated by ASTM International, 100 Barr Harbor Drive, PO Box C700, West Conshohocken, Pa., 19428-2959.

As specified in ASTM E595, a specimen was exposed to 50% relative humidity at ±23° C. for 24 hours. An initial mass of the sample was measured. The sample was then heated to +125° C. in a vacuum of at least 5×10-5 Torr, for 24 hours. Some of the outgassed vapor condensed on a separate collector plate. A final weight was then recorded for the sample.

Total mass loss (TML) was calculated by subtracting the final weight from the initial weight.

The weight increase of the collector plate was used to determine the collected volatile condensable materials (CVCM).

The sample may then be stored for 24 hours at 50% relative humidity and +23° C. After this another weight may be recorded to determine a percentage of water vapor regained (WVR).

Specifications for spacecraft materials may specify a TML of less than 1.0% and a CVCM of less than 0.10%. When water vapor contamination is not a concern it may be acceptable to have a TMLWVR of less than 1.0%.

Results of outgassing evaluation of the sample of the static dissipative resin used to manufacture the cable ties of Groups A through I, are provided in Table 9.

TABLE 9

Outgassing Measurements of a Sample

| Sample Temp. | Collector Temp. | TML | CVCM | TMNL WVR |
|---|---|---|---|---|
| 125° C. | 25° C. | 0.04% | 0.01% | Not Measured |

As can be seen from Table 9, the sample of the static dissipative resin has suitable outgassing TML and CVCM properties for extraterrestrial applications.

Summary of Cable Tie Groups

Table 10 summarizes the groups of cable ties, corresponding evaluations, and any processes applied thereto.

TABLE 10

| | Process | | Evaluation | | |
|---|---|---|---|---|---|
| Group ID | Heating/Cooling Cycles | Irradiated | Resistivity | Tensile | Outgas |
| Group A (A1-A10) | — | — | A1-A10 | A1-A7 | — |

TABLE 10-continued

| Group ID | Process Heating/Cooling Cycles | Irradiated | Evaluation Resistivity | Tensile | Outgas |
|---|---|---|---|---|---|
| Group B (B1-B10) | B1-B10 (25°/180° C.) | — | B1-B10 | B1-B7 | — |
| Group C (C1-C10) | C1-C10 (25°/200° C.) | — | C1-C10 | C1-C7 | — |
| Group D (D1-D5) | — | D1-D5 (5 Mrad) | — | D1-D5 | — |
| Group E (E1-E10) | — | E1-E10 (10 Mrad) | — | E1-E10 | — |
| Group F (Type TYZ23M-SF) | — | — | — | Multiple (Mfg. evaluated at elevated temperature) | — |
| Group G (Type TYZ23M-SF) | — | — | — | Multiple (Mfg. evaluated at ambient temperature) | — |
| Group H (Type TYZ25M-SF) | — | — | — | Multiple (Mfg. evaluated at elevated temperature) | — |
| Group I (Type TYZ25M-SF) | — | — | — | Multiple (Mfg. evaluated at ambient temperature) | — |
| Group J (sample of raw material) | — | — | — | — | Yes |

Example Articles

An article may be formed of a static dissipative ETFE resin, and may be heat-treated, such as disclosed above with respect to one or more of methods 400 and 500, and/or combinations thereof, such as to decrease an electrical resistance of the article and/or to increase a tensile strength of the article.

An article may be formed of a static dissipative ETFE resin, and may be irradiated, such as disclosed above with respect to method 800, such as to increase a tensile strength of the article.

An article may be formed of a static dissipative ETFE resin, and may be heat-treated and irradiated, such as disclosed above with respect to a one or more of methods 400 and 500, in combination with method 800, such as to decrease an electrical resistance of the article and to increase a tensile strength of the article.

An article formed of an ETFE resin may include, for example and without limitation, a cable strap to wrap, support, and/or secure one or more wires or cables, such as a cable tie.

An article formed as disclosed herein may be suitable for a variety of environments and applications, including, for example, a radiation storm belt probe.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein,

What is claimed is:

1. An apparatus, comprising:
a plurality of cable straps, each cable strap formed of a static dissipative ethylene tetrafluoroethylene (ETFE) resin, including electrically conductive elements with carbon black particles, and a plurality of polymer chains, each cable strap including a substantially smooth edge surface with an initial average electrical resistivity, measured between two points that are approximately six inches apart, of at least approximately 150 mega Ohms, wherein each cable strap is treated by:
repeatedly heating the cable strap to a first temperature within a range of approximately 150° Celsius and a melting point of the resin and cooling the cable strap to a second temperature; and
irradiating the cable strap to within a range of approximately 5 mega rads to 10 mega rads at a radiation rate of about 17 rads/second, and wherein, for each treated cable strap,
the electrically conductive elements of the ETFE resin are segregated away from the plurality of polymer chains within the cable strap, and
the average electrical resistivity of the substantially smooth edge surface, measured between the two points that are approximately six inches apart, is less than approximately 50 mega Ohms.

2. The apparatus of claim 1, wherein the average electrical resistivity is less than approximately 25 mega Ohms.

3. The apparatus of claim 1, wherein
the first temperature is within a range of approximately 180° Celsius and 200° Celsius, and
the second temperature is within a range of approximately 25° Celsius and less than 180° Celsius.

4. The apparatus of claim 3, wherein the first temperature is approximately 180° Celsius.

5. The apparatus of claim 3, wherein the first temperature is approximately 200° Celsius.

6. The apparatus of claim 1, wherein
the first temperature is approximately 180° Celsius,
the second temperature is approximately 25° Celsius,
the cable strap is held at the corresponding first and second temperatures for approximately one hour, and
the repeating includes repeating the heating and the cooling of the cable strap for a total of approximately ten cycles of the heating and the cooling.

7. The apparatus of claim 1, wherein
the first temperature is approximately 200° Celsius,
the second temperature is approximately 25° Celsius,
the cable strap is held at the corresponding first and second temperatures for approximately one hour, and
the repeating includes repeating the heating and the cooling of the cable strap for a total of approximately ten cycles of the heating and the cooling.

* * * * *